United States Patent
Gao

(10) Patent No.: US 8,933,675 B2
(45) Date of Patent: Jan. 13, 2015

(54) TWO-INDUCTOR BASED AC-DC OFFLINE POWER CONVERTER WITH HIGH EFFICIENCY

(71) Applicant: iWatt Inc., Campbell, CA (US)

(72) Inventor: Xiaolin Gao, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 128 days.

(21) Appl. No.: 13/801,391

(22) Filed: Mar. 13, 2013

(65) Prior Publication Data

US 2014/0159486 A1 Jun. 12, 2014

Related U.S. Application Data

(60) Provisional application No. 61/735,472, filed on Dec. 10, 2012.

(51) Int. Cl.
*G05F 1/00* (2006.01)
*G05F 1/613* (2006.01)

(52) U.S. Cl.
CPC ..................................... *G05F 1/613* (2013.01)
USPC .............................. 323/266; 323/267; 363/65

(58) Field of Classification Search
USPC ........... 307/11, 12, 13, 15, 31, 32, 33, 34, 36; 363/65–72; 323/222, 232, 265, 266, 323/267
See application file for complete search history.

(56) References Cited

U.S. PATENT DOCUMENTS

| | | | | |
|---|---|---|---|---|
| 4,230,981 A | * | 10/1980 | Rambold | 323/267 |
| 5,006,782 A | * | 4/1991 | Pelly | 323/225 |
| 5,336,985 A | * | 8/1994 | McKenzie | 323/266 |

* cited by examiner

*Primary Examiner* — Nguyen Tran
(74) *Attorney, Agent, or Firm* — Fenwick & West LLP

(57) ABSTRACT

Embodiments disclosed herein describe the use of two inductors in a non-isolated power converter. The power converter receives power from a non-regulated power source, and converts the received power to regulated output signals. Each inductor in the power converter receives power provided from the non-regulated power source via a switch controlled by a controller, and provides a regulated output to a power converter load. A first regulated output provided by a first inductor can be representative of a second regulated output provided by a second inductor. In addition, a voltage feedback signal can be provided for use by the controller based on the first regulated output and/or the second regulated output.

15 Claims, 6 Drawing Sheets

TWO-INDUCTOR BASED AC-DC OFFLINE POWER CONVERTER WITH HIGH EFFICIENCY

RELATED APPLICATIONS

This application claims the benefit of U.S. Provisional Application No. 61/735,472, filed Dec. 10, 2012, the content of which is incorporated by reference herein in its entirety.

BACKGROUND

1. Field of Technology

Embodiments disclosed herein relate generally to a power converter, and more specifically, to a power converter providing a low voltage auxiliary output for greater operating efficiency of the power converter.

2. Description of the Related Arts

Switching power converters are employed to provide regulated output(s) to electronic devices while being coupled to an unregulated power source. Often times, the voltage level of the unregulated power source is significantly higher than the regulated output voltage levels. This is often the case when the power source is an AC power main.

In addition to providing regulated outputs to external load devices, many power converters require an internal low voltage output for a power control integrated circuit ("controller"). The controller can include low voltage analog and digital circuitry configured to enable feedback control and protection functionality for the power converter. Providing the high voltage input to power the controller requires using a pass element (such as a linear regulator) and is highly inefficient. For example, the typical operating voltage range of a power controller is 5 VDC to 16 VDC, whereas the typical AC input voltage range is 90 VAC to 270 VAC. In addition, an isolating power transformer can be used to provide power to the controller. While more efficient than using the high voltage input to power the controller, such an embodiment requires the use of an additional transformer, which adds additional cost and circuit complexity.

Accordingly, there is a need to provide and control a non-isolated power converter that maintains multiple regulated outputs without compromising system cost and complexity for operational performance.

SUMMARY

Embodiments disclosed herein describe the use of two inductors in a non-isolated power converter. The power converter receives power from a non-regulated power source, and converts the received power to regulated outputs. The power converter includes a switch configured to provide the non-regulated input to the two inductors when the switch is in an "on" state, and is configured to act as an open circuit when the switch is in an "off" state.

Each inductor in the power converter receives and stores energy provided from the non-regulated power source, and transfers the stored energy to provide a regulated output to a power converter load. A first regulated output provided by a first inductor can be representative of a second regulated output provided by a second inductor. The inductance of the first inductor can be selected such that the first inductor discharges faster than the second inductor when transferring energy to the respective regulated outputs.

The power converter includes a controller configured to control the switching of the power converter switch. The controller can receive a low voltage signal from the first regulated output to maintain operation of the controller. In addition, a voltage divider can be coupled across the two inductors, and the controller can use a signal received from a voltage divider output as a feedback signal. The controller can control the switching of the power converter switch based on the received feedback signal.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (Figs.) and the following description relate to various embodiments by way of illustration only. It should be noted that from the following discussion, alternative embodiments of the structures and methods disclosed herein will be readily recognized as viable alternatives that may be employed without departing from the principles discussed herein.

Reference will now be made in detail to several embodiments, examples of which are illustrated in the accompanying figures. It is noted that wherever practicable similar or like reference numbers may be used in the figures and may indicate similar or like functionality. The figures depict various embodiments for purposes of illustration only. One skilled in the art will readily recognize from the following description that alternative embodiments of the structures and methods illustrated herein may be employed without departing from the principles described herein.

Embodiments disclosed herein describe the use of two inductors in a non-isolated power converter. The power converter receives power from a non-regulated power source, and converts the received power to regulated outputs. Each inductor in the power converter receives power provided from the non-regulated power source via a controller, and provides a regulated output to a power converter load. In one embodiment, a first inductor configured to provide a primary regulated output to a primary load is referred to herein as a "primary inductor," and a second inductor configured to provide a secondary regulated output to a secondary load (such as a feedback controller) is referred to herein as a "secondary inductor." The secondary regulated output can be based on or representative of the primary regulated output. In addition, a voltage feedback signal can be provided for use by the controller based on the secondary regulated output and/or the primary regulated output.

Figure 1:
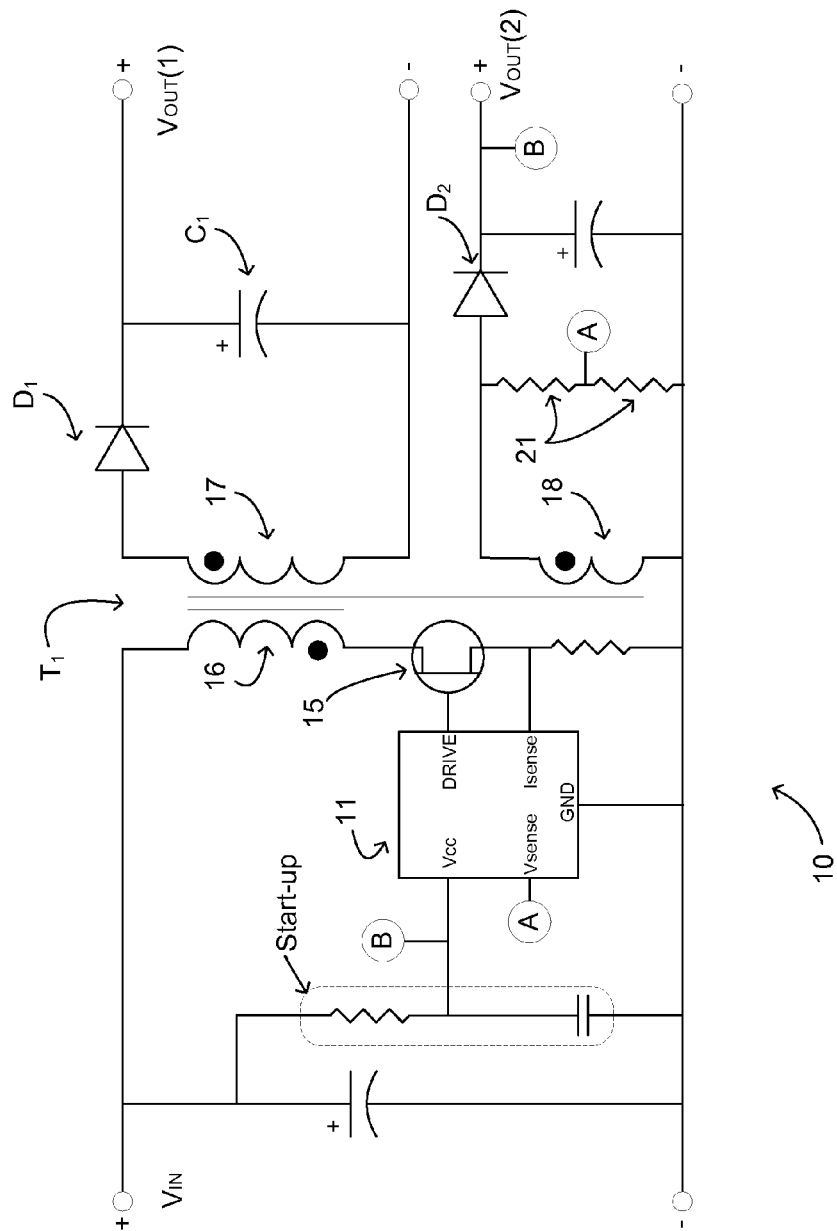
FIG. 1 illustrates a block diagram of a conventional isolated power converter, according to one embodiment.

In power converters that require primary to secondary isolation, a power transformer is used to provide galvanic isolation. FIG. 1 illustrates a block diagram of a conventional isolated power converter 10 (e.g., a primary-side fly-back switching power converter), according to one embodiment. The isolated power converter of FIG. 1 includes, among other components, a transformer $T_1$ having a primary winding 16, a secondary winding 17, and an auxiliary winding 18. The isolated power converter also includes a switch 15 (such as a transistor) and a controller 11.

An input voltage $V_{IN}$ (such as a rectified AC voltage) is received by the isolated power converter 10. The controller 11 controls the on state and the off state of the switch 15 using, for example, pulse width modulation (PWM) or pulse frequency modulation (PFM). When the switch is on, energy is stored in the primary winding 16, which results in a negative voltage across the secondary winding 17, reverse-biasing the diode $D_1$. Accordingly, a capacitor $C_1$ provides energy as a regulated output $V_{OUT(1)}$. When the switch is off, the energy stored in the primary winding is partially transferred to the secondary winding and the diode becomes forward biased, enabling the transfer of energy stored in the transformer $T_1$ to the regulated output $V_{OUT(1)}$ and recharging the capacitor $C_1$.

Similarly, when the switch 15 is on, energy is stored in the primary winding 16, which results in a negative voltage across the auxiliary winding 18, reverse-biasing the diode D2, and when the switch is off, the stored energy is transferred to the auxiliary winding, forward-biasing the diode D2. The resulting regulated output $V_{OUT(2)}$ is provided to the $V_{CC}$ input of the controller 11. In addition, resistors 21 form a voltage divider coupled across the auxiliary winding. Node A between the resistors is coupled to the $V_{sense}$ input of the controller. The values of the resistors can be selected so as to provide a signal $V_{sense}$ that is representative of the output voltage $V_{OUT(1)}$. It should be noted that the turns-ratio of the primary winding 16, the secondary winding 17, and the auxiliary winding can be selected based on the desired output voltages $V_{OUT(1)}$ and $V_{OUT(2)}$.

Figure 2:
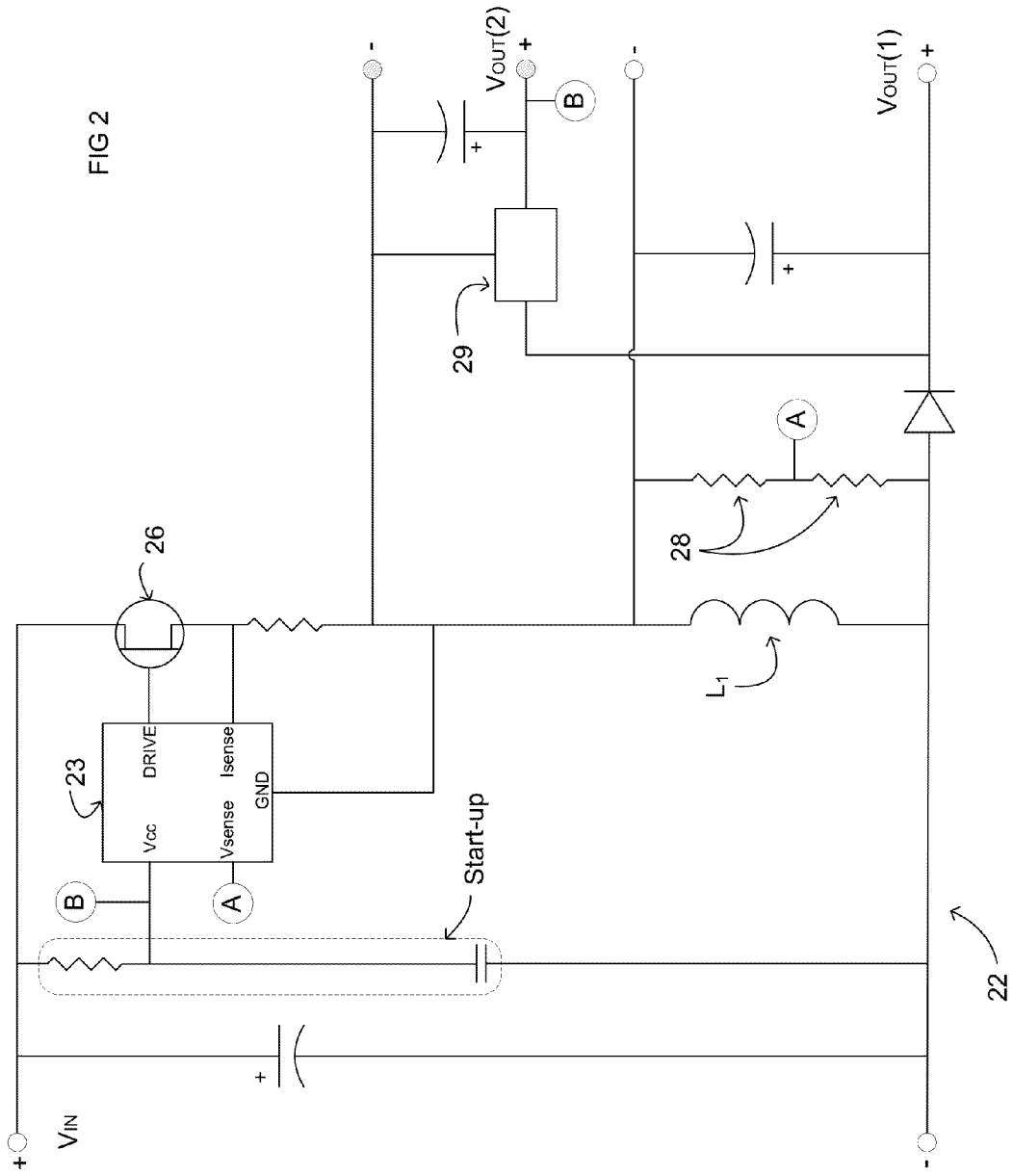
FIG. 2 illustrates a block diagram of a conventional non-isolated power converter, according to one embodiment.

Employing an auxiliary winding 18 within the transformer $T_1$ provides a cost effective and efficient way of providing the controller 11 with a regulated low voltage output. However, in environments in which primary-to-second isolation is not required, the use of a transformer can add unnecessary cost and system complexity. In such embodiments, a non-isolated power converter can be implemented. FIG. 2 illustrates a block diagram of a conventional non-isolated power converter 22 (for instance, employing a buck-boost topology), according to one embodiment.

In the embodiment of FIG. 2, an input voltage $V_{IN}$ is received by the power converter 22, and the controller 23 provides regulated outputs $V_{OUT(1)}$ and $V_{OUT(2)}$ by controlling the switching of the switch 26. The controller turns the switch on and off based on the feedback signals $V_{sense}$ and $I_{sense}$. When the switch is on, energy is stored in the inductor 27, and when the switch is off, the stored energy is delivered by the inductor to a load coupled to the regulated output $V_{OUT(1)}$.

A voltage divider is implemented with the resistors 28 coupled across the inductor $L_1$, and the voltage at Node A between the resistors is applied to the $V_{sense}$ input of the controller 23. As with the embodiment of FIG. 1, the values of the resistors can be selected so that $V_{sense}$ is representative of the output voltage $V_{OUT(1)}$. The second regulated output $V_{OUT(2)}$ is provided by employing a linear pass element 29 across the inductor. $V_{OUT(2)}$ is supplied to the $V_{CC}$ input of the controller, providing a regulated low voltage output to maintain the operation of the controller. It should be noted that when the voltage regulation level of $V_{OUT(1)}$ is significantly higher than the voltage regulation level of $V_{OUT(2)}$, the linear pass element reduces the operational efficiency of the power converter 22. In addition, the linear pass element can cause component rating and heat dissipation issues that can require additional system complexity to mitigate.

Figure 3:
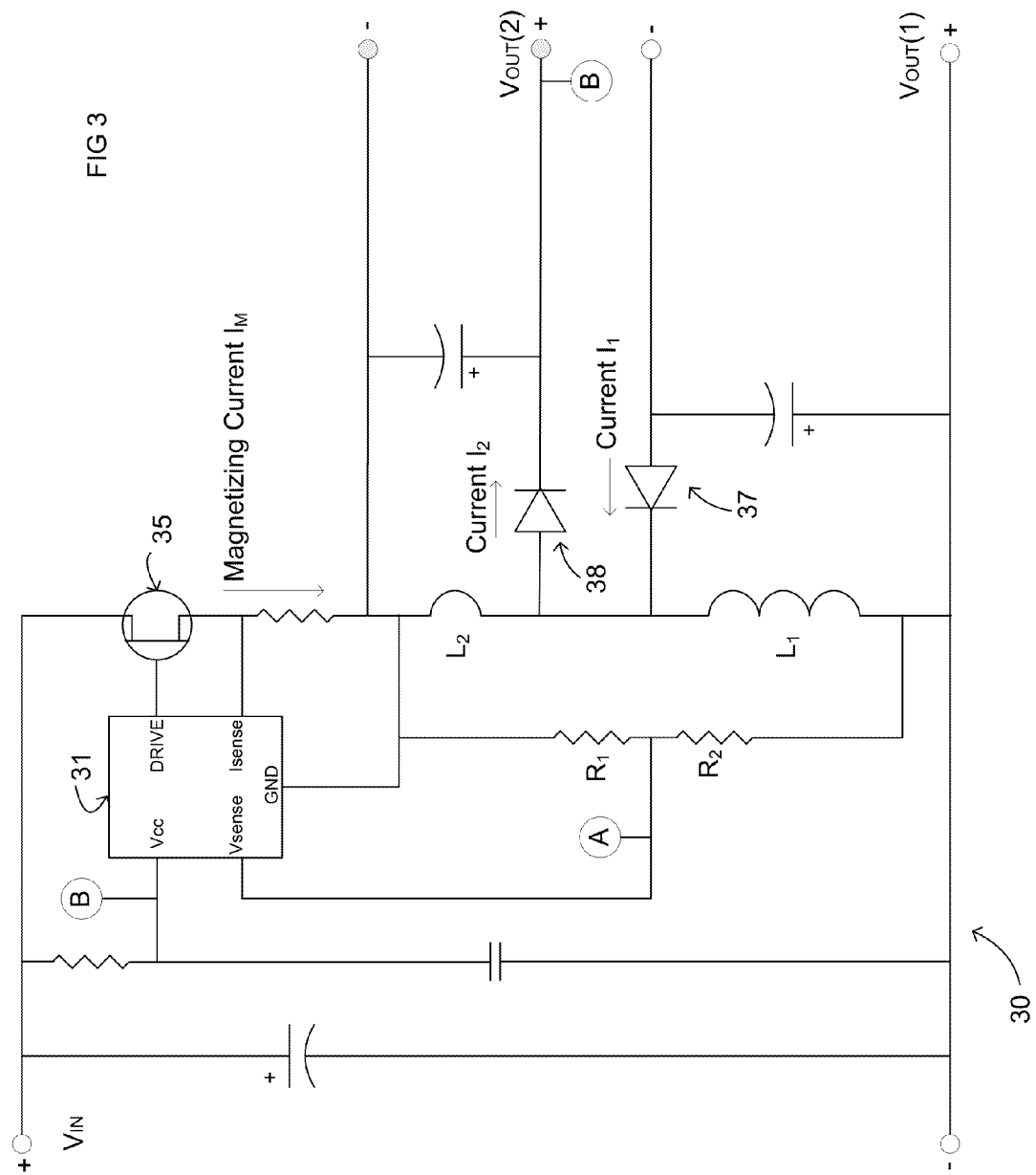
FIG. 3 illustrates a block diagram of a non-isolated two-inductor power converter, according to one embodiment.

FIG. 3 illustrates a block diagram of a non-isolated two-inductor power converter 30, according to one embodiment. Although the power converter shown in FIG. 3 is a buck-boost configuration, other power converter configurations may be implemented according to the description herein. The power converter of FIG. 3 includes a controller 31, a switch 35, a primary inductor $L_1$, a secondary inductor $L_2$, and resistors $R_1$ and $R_2$. The controller receives the unregulated input voltage $V_{IN}$ and provides regulated outputs $V_{OUT(1)}$ and $V_{OUT(2)}$ by providing a "drive" signal to the switch based on the feedback signals received at the inputs $V_{sense}$ and $I_{sense}$, iteratively turning the switch on and off.

It should be noted that as used herein, "$L_1$" and "$L_2$" refer to both the inductors and the inductance of the inductors. Similarly, "$R_1$" and "$R_2$" refer to both the resistors and the resistance of the resistors. In addition, "$V_{OUT(1)}$" and "$V_{OUT(2)}$" refer to both the regulated outputs and the voltages of the regulated outputs. Finally, "$I_M$", "$I_1$", and "$I_2$" refer to both the currents and the amount of amperes of the current.

When the controller 31 places the switch 35 in the 'on' state, a magnetizing current $I_M$ flows through the switch and through the inductors $L_1$ and $L_2$, resulting in the storage of energy by the inductors. The current $I_M$ results in a negative voltage across the inductors, reverse-biasing the diodes 37 and 38, and isolating the regulated outputs $V_{OUT(1)}$ and $V_{OUT(2)}$ from the inductors $L_1$ and $L_2$, respectively. The current $I_M$ increases with time while the switch is in on at a rate of $V_{IN}/(L_1+L_2)$. The energy stored by the inductors $L_1$ and $L_2$ is $0.5(L_1)(I_p)^2$ and $0.5(L_2)(I_p)^2$, respectively, wherein $I_p$ is the peak value of $I_M$.

When the controller 31 subsequently places the switch 35 in the 'off' state, the switch becomes an open circuit and the magnetizing current $I_M$ stops flowing through the switch. At this time, as the magnetizing current $I_M$ is no longer flowing through the inductors $L_1$ and $L_2$, the energy stored by the inductors $L_1$ and $L_2$ is released. When energy stored by the inductor $L_1$ is released, a current $I_1$ flows through the inductor $L_1$, forward-biasing the diode 37 and resulting in the transfer of energy from the inductor $L_1$ to a load coupled to the regulated output $V_{OUT(1)}$. The current $I_1$ decreases at a rate of $V_{OUT(1)}/L_1$ until the energy stored by the inductor $L_1$ is depleted. When the energy stored by $L_1$ is depleted, the current $I_1$ stops flowing through the inductor $L_1$, and the diode 37 stops conducting.

Similarly, when the energy stored by the inductor $L_2$ is released, a current $I_2$ flows through the inductor $L_2$, forward-biasing the diode 38 and resulting in the transfer of energy from the inductor $L_2$ to a load coupled to the regulated output $V_{OUT(2)}$. The current $I_2$ decreases at a rate of $V_{OUT(2)}/L_2$ until the energy stored by the inductor $L_2$ is depleted. When the energy stored by $L_2$ is depleted, the current $I_2$ stops flowing through the inductor $L_2$, and the diode 38 stops conducting. As used herein, the amount of time between the turning-off of the switch 35 and the complete discharging of an inductor (either $L_1$ or $L_2$) is referred to as the "discharge time" of the inductor.

The resistors $R_1$ and $R_2$ are coupled in series across $L_1$ and $L_2$, forming a voltage divider. Node A between the resistors is coupled to the $V_{sense}$ input of the controller 31. Thus, the voltage divider made of $R_1$ and $R_2$ provides a feedback signal $V_{sense}$ to the controller, allowing the controller to further drive the switch 35 based on the $V_{sense}$ feedback signal.

It may be desirable to optimize the output regulation characteristics of the regulated output $V_{OUT(1)}$ while simultaneously minimizing the impact of cross regulation between $V_{OUT(1)}$ and $V_{OUT(2)}$. In order to further this aim, the inductance values of $L_1$ and $L_2$ can selected such that the ratio of $L_2$ to $L_1$ is such that the reset time of $L_2$ is shorter than the reset time of $L_1$. After the switch 35 is turned off, during the intermediary interval of time (referred to herein as the "sense" interval) after the reset time of $L_2$ but before the reset time of $L_1$, the voltage at Node A (the $V_{sense}$ input) represents the reflected voltage of $V_{OUT(1)}$ only. Such a configuration can maximize the output regulation characteristics of $V_{OUT(1)}$ if the controller 31 samples $V_{sense}$ during the sense interval. In one embodiment, the controller is configured to sample the voltage at Node A during the sense interval, for instance by configuring the controller to wait until after a reset time known to be associated with $L_2$ before sampling the received $V_{sense}$ signal.

Figure 4:
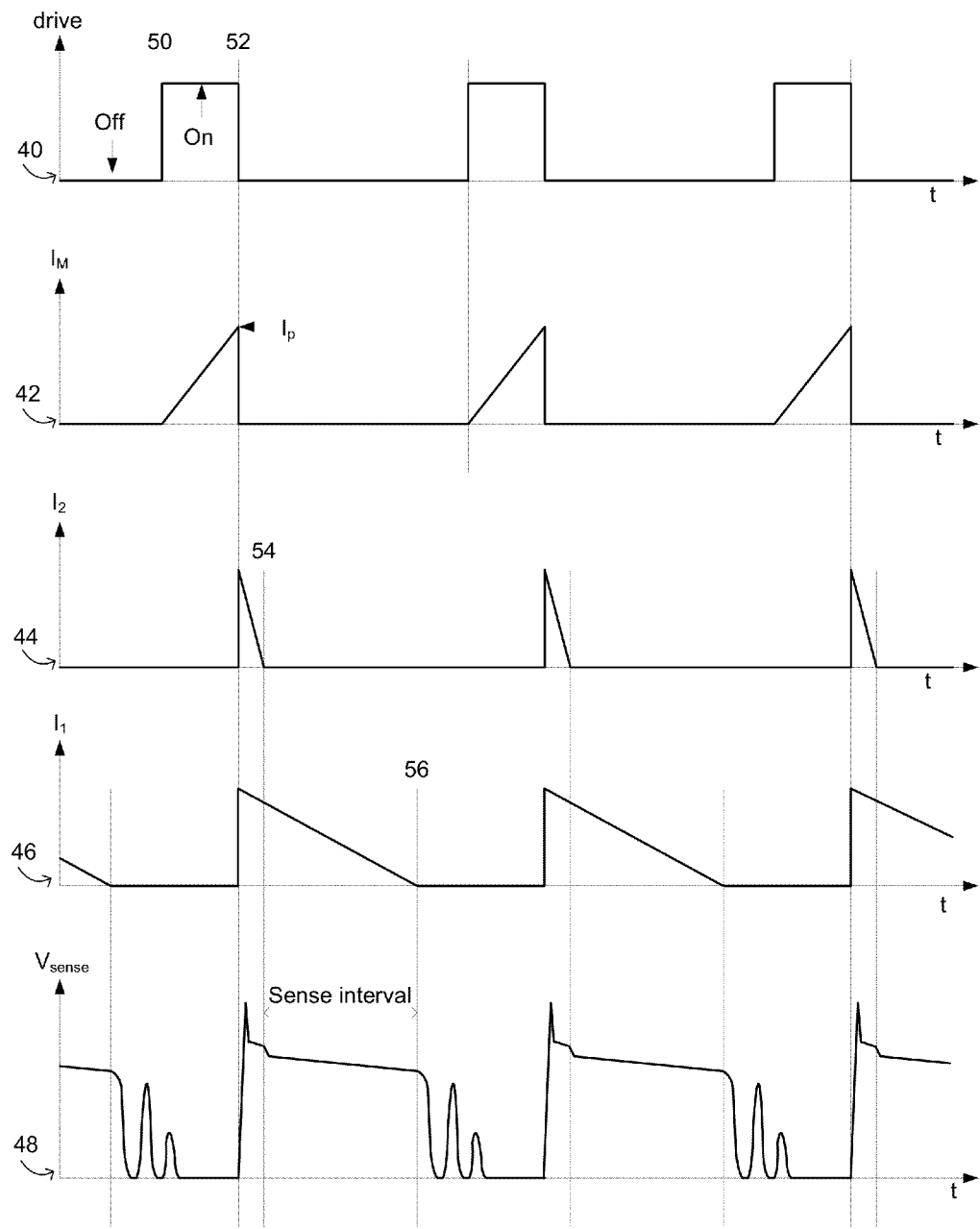
FIG. 4 illustrates operating waveforms of a non-isolated two-inductor power converter, according to one embodiment.

FIG. 4 illustrates operating waveforms of a non-isolated two-inductor power converter, according to one embodiment. Waveform 40 illustrates the value of the drive signal produced by the controller 31. Waveform 42 illustrates the value of the magnetizing current $I_M$. Waveforms 44 and 46 illustrate the value of the currents $I_2$ and $I_1$, respectively. Waveform 48 illustrates the value of the signal received by the $V_{sense}$ input of the controller.

The drive signal of waveform 40 comprises an iterative transition between an "off" value (associated with a signal that places the switch 35 in an off state) and an "on" value (associated with a signal that places the switch in an on state). The duty cycle of the drive signal can be based on, for instance, the $V_{sense}$ and $I_{sense}$ signals received by the controller. In the embodiment of FIG. 4, during one iteration of switching, the drive signal transitions from off to on at time 50, and from on to off at time 52.

The magnetizing current $I_M$ illustrated in waveform 42 begins to increase at time 50, in response to the switch 35 being placed in the on state by the controller 31. The rate of increase of the current $I_M$, as noted above, $V_{IN}/(L_1+L_2)$, proportional to the sum of the inductors as a result of the inductors being coupled in series. The current $I_M$ increases until the switch is places in the off state at time 52. At time 52, current sourced from the input $V_{IN}$ drops immediately to zero. The maximum value of $I_M$, $I_p$, occurs at time 52.

Between time 50 and time 52, the diodes 37 and 38 are reversed-biased. Accordingly, no current flows through the diodes, and the values of $I_1$ and $I_2$ are zero, as shown in waveforms 44 and 46. At time 52, when the switch 35 turns off, the energy stored in the inductors L1 and L2 is transferred to the loads coupled to the regulated outputs $V_{OUT(1)}$ and $V_{OUT(2)}$, respectively. The amount of current provided by $L_1$ and $L_2$ during the transfer of energy jumps almost immediately at time 52, and decreases over time at rates proportional to the values of $L_1$ and $L_2$, as noted above.

In the embodiment of FIG. 4, the amount of energy stored by the inductor $L_2$ is smaller than the amount of energy stored by the inductor $L_1$. Accordingly, the current $I_2$ decreases to zero at a rate faster than the current $I_1$. As shown in waveform 44, the reset time of the inductor $L_2$ is the interval of time between time 52 (when the switch 35 turns off) and time 54 (when the current $I_2$ goes to 0 as a result of the energy stored by $L_2$ being entirely dissipated). Similarly, the reset time of the inductor $L_1$ is the interval of time between time 52 (when the switch turns off) and time 56 (when the current $I_1$ goes to 0 as a result of the energy stored by $L_1$ being entirely dissipated).

The reset time of the inductor $L_1$ is longer than the reset time of the inductor $L_2$. Accordingly, a sense interval occurs between time 54 and time 56, during which the signal received by the $V_{sense}$ input of the controller 31 represents the reflected voltage of $V_{OUT(1)}$ only. As indicated in waveform 48, the value of signal received by the $V_{sense}$ input is unstable between times 52 and 54, and after time 56, but remains relatively stable during the sense interval between times 54 and 56.

By selecting an inductance of the inductor $L_2$ representing a fraction of the inductance of the inductor $L_1$, the sense interval can be maximized, increasing the time interval during which the controller 31 can sample the signal received by the $V_{sense}$ input while the voltage regulation characteristics of the output $V_{OUT(1)}$ are optimized. In one embodiment, the optimal time to sample the signal received by the Vsense input during the sense interval is immediately prior to time 56, during which the impact of path losses and the variation of rectifier drop are minimized. In addition, by selecting the inductance of the inductor $L_2$ to be suitable small, the impact of cross regulation between $V_{OUT(1)}$ and $V_{OUT(2)}$ (the time period between times 52 and 54 in the embodiment of FIG. 3) can be minimized. In one example embodiment, the inductance of $L_2$ is approximately one tenth of the inductance of $L_1$.

Figure 5:
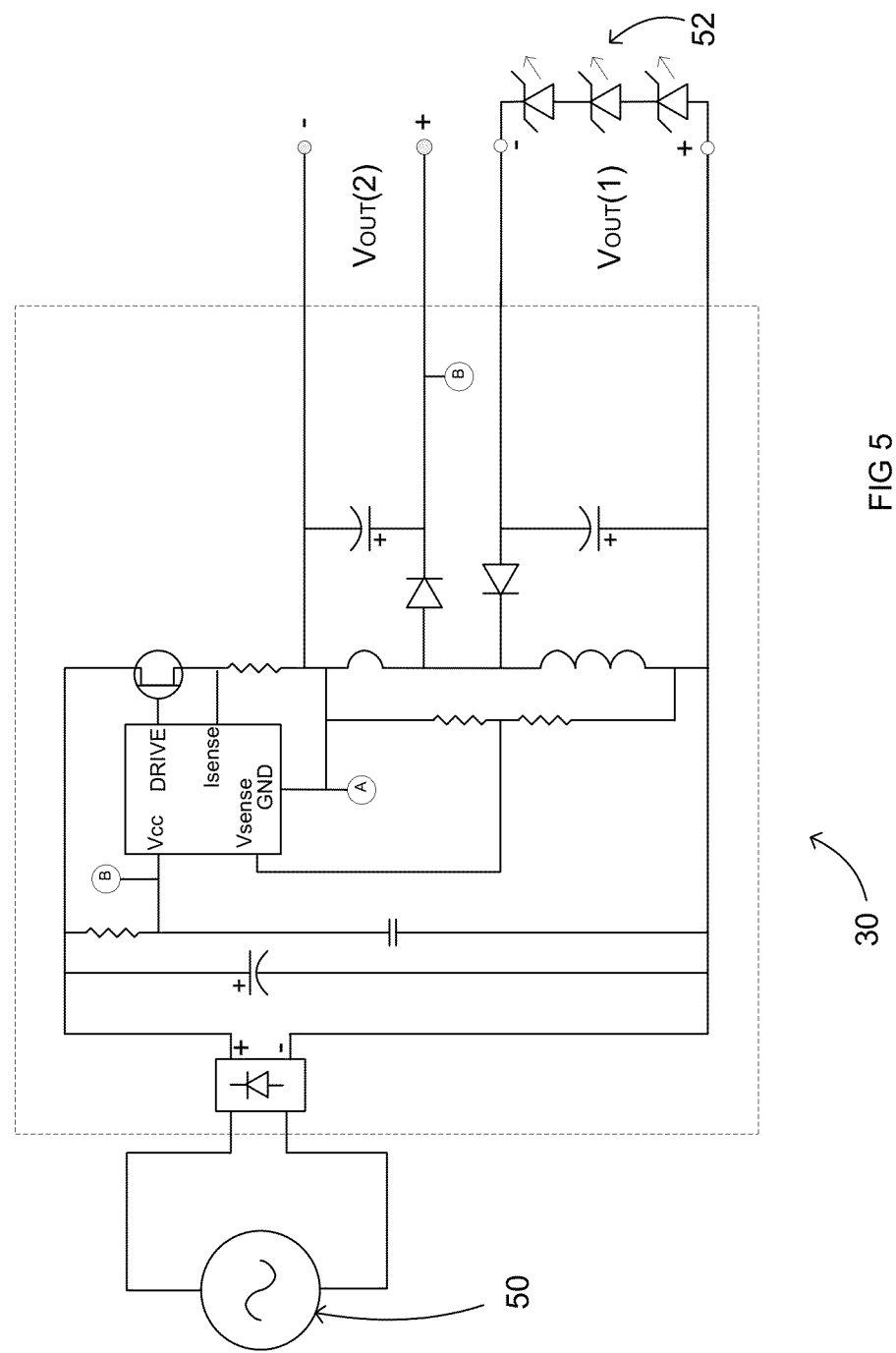
FIG. 5 illustrates a block diagram of a non-isolated two-inductor power converter coupled to an AC main and an LED load, according to one embodiment.

FIG. 5 illustrates a block diagram of a non-isolated two-inductor power converter 30 coupled to an AC main 50 and an LED load 52, according to one embodiment. In one embodiment, the power converter of FIG. 5 is the power converter of FIG. 3. The AC main can be a conventional AC power supply, for instance a residential or commercial AC power supply (such as a wall outlet or a power generator). The LED load can be an LED lamp, or can be any other LED load.

In the embodiment of FIG. 5, the LED load is coupled to the regulated output $V_{OUT(1)}$. It should be noted that in other embodiments, the regulated output $V_{OUT(1)}$ is coupled to another load, for instance, a non-LED light-emitting load, an amplifier, a sound-emitting load, or any other suitable load configured to receive regulated outputs. It should also be noted that while the regulated output $V_{OUT(2)}$ is coupled to the controller of the power converter 30 in the embodiments described herein, in other embodiments, the regulated output $V_{OUT(2)}$ can be coupled to an external load, such as another controller or IC.

Figure 6:
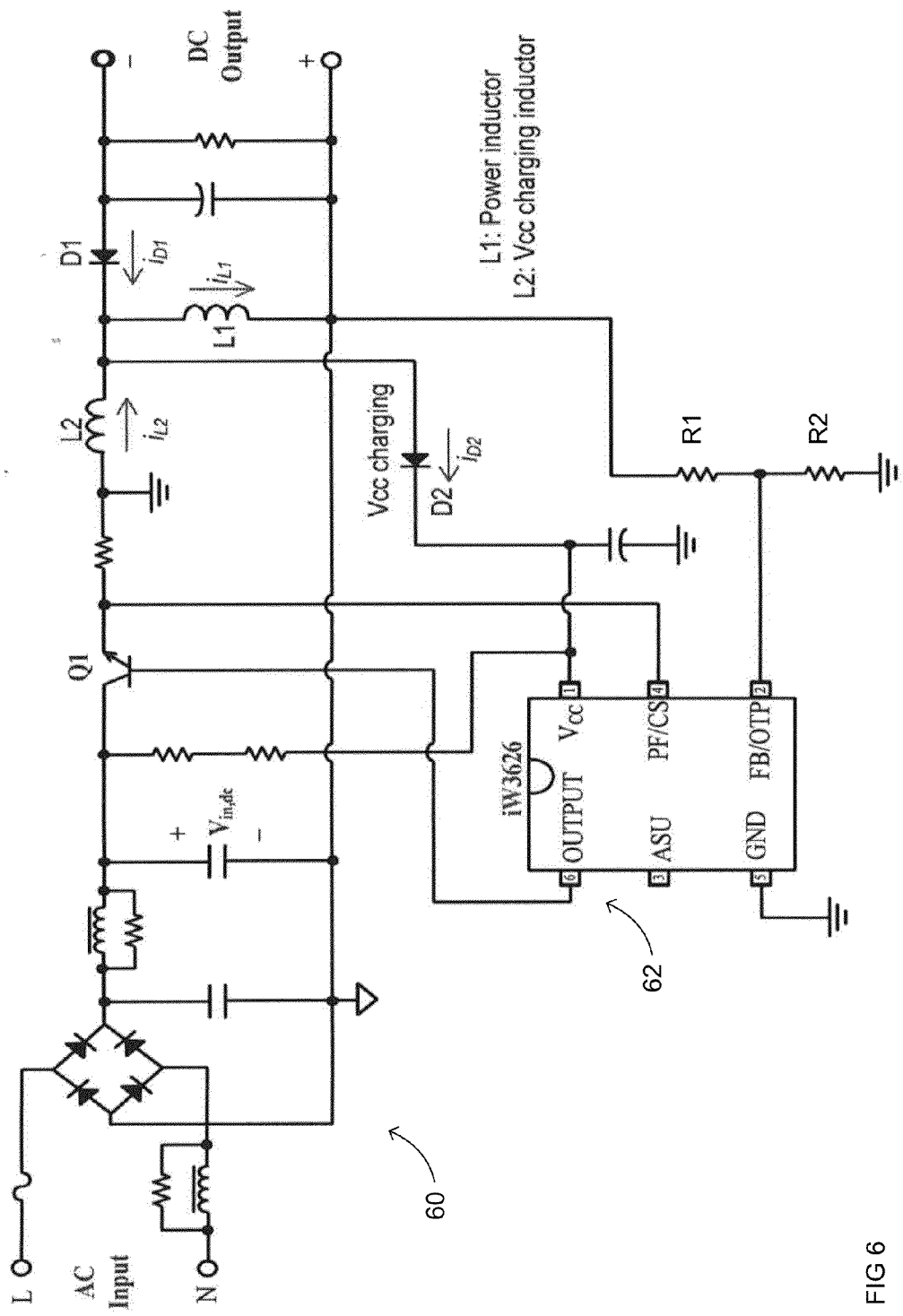
FIG. 6 illustrates a block diagram of a non-isolated two-inductor power converter, according to one embodiment.

FIG. 6 illustrates a block diagram of a non-isolated two-inductor power converter 60, according to one embodiment. In one embodiment, the power converter of FIG. 6 functions similarly to the power converter 30 of FIG. 3. The power converter includes a bipolar junction transistor ("BJT") Q1 that is switched on and off by the controller 62.

When the transistor Q1 is turned on, current flows from the AC input, through the transistor Q1, and through the inductors L1 and L2, charging the inductors. During this time, the diodes D1 and D2 are reverse-biased, and act as open circuits. When the transistor Q2 is turned off, the diodes D1 and D2 become forward biased, and two current loops are formed. Current flows through the first loop, through the diode D1, and through the inductor L1. Current also flows through the second loop, through the inductor L2, and through the diode D2. In the embodiment of FIG. 6, the first loop provides the regulated output "DC Output" by transferring energy stored in the inductor L1 to a load coupled to the DC Output. In addition, the second loop transfers a smaller amount of energy stored in the inductor L2 to the Vcc input of the controller 62.

A voltage divider including resistors R1 and R2 is coupled to the inductor L1. The node between resistors R1 and R2 is coupled to the FB/OTP input of the controller 62, and provides a feedback signal to the controller as described above with regards to FIG. 3. As described above, the controller can control the switching of the transistor Q1 based on this feedback signal.

Upon reading this disclosure, those of skill in the art will appreciate still additional alternative designs for a two-inductor based AC-DC offline power controller. Thus, while particular embodiments and applications have been illustrated and described, it is to be understood that the embodiments discussed herein are not limited to the precise construction and components disclosed herein and that various modifications, changes and variations which will be apparent to those skilled in the art may be made in the arrangement, operation and details of the method and apparatus disclosed herein without departing from the spirit and scope of the disclosure.

What is claimed is:

1. A power converter circuit comprising:
an input configured to receive an unregulated input signal;
a switch configured to:
   receive the unregulated input signal;
   receive a switch control signal;
   responsive to receiving a switch control signal configuring the switch to act as a short circuit, outputting the unregulated input signal on a switch output; and
   responsive to receiving a switch control signal configuring the switch to act as an open circuit, preventing the unregulated input voltage from being outputted on the switch output;
a first inductor coupled to the switch output, and configured to:
   store energy from the unregulated input signal when the switch is configured to act as a short circuit; and
   transfer stored energy to a first regulated output when the switch is configured to act as an open circuit over a first interval of time;
a second inductor coupled in series to the first inductor, and configured to:
   store energy from the unregulated input signal when the switch is configured to act as a short circuit; and
   transfer stored energy to a second regulated output when the switch is configured to act as an open circuit over a second interval of time longer than the first interval of time;
a voltage divider coupled in parallel to the first and second inductors and comprising an output node, the voltage divider configured to provide a feedback signal via the output node; and
a controller coupled to the voltage divider output and to the switch and configured to output a switch control signal to the switch based on a received feedback signal sampled after the first inductor discharges but before the second inductor completely discharges.

2. The power converter of claim 1, wherein the unregulated input signal comprises a signal received from an AC main.

3. The power converter of claim 1, wherein the switch comprises a bipolar junction transistor.

4. The power converter of claim 1, wherein the controller is further coupled to the first regulated output, and wherein the controller is further configured to output a switch control signal to the switch based on a signal received from the first regulated output.

5. The power converter of claim 1, wherein the second regulated output is coupled to an LED load.

6. The power converter of claim 1, wherein the first regulated output is configured to provide a signal representative of a signal provided by the second regulated output.

7. The power converter of claim 1, wherein the feedback signal is representative of signals provided by the first regulated output and the second regulated output.

8. The power converter of claim 1, wherein the inductance of the first inductor is less than half of the inductance of the second inductor.

9. A power converter circuit comprising:
a switch configured to output a received unregulated input signal in a first state;
a first inductor coupled to the switch, and configured to store energy from the unregulated input signal when the switch is in the first state and to transfer the stored energy to a first regulated output over a first interval of time when the switch is in a second state;
a second inductor coupled to the first inductor, and configured to store energy from the unregulated input signal when the switch is in the first state and to transfer the stored energy to a second regulated output over a second interval of time longer than the first interval of time when the switch is in the second state; and
a controller coupled to the first regulated output and to a voltage divider coupled across the first and second inductors, and configured to control the state of the switch based on a low voltage signal received from the first regulated output and a feedback signal received from the voltage divider, the feedback signal sampled after the first inductor discharges but before the second inductor completely discharges.

10. The power converter of claim 9, wherein the unregulated input signal comprises a signal received from an AC main.

11. The power converter of claim 9, wherein the switch comprises a bipolar junction transistor.

12. The power converter of claim 9, wherein the second regulated output is coupled to an LED load.

13. The power converter of claim 9, wherein the low voltage signal is representative of a signal provided by the second regulated output.

14. The power converter of claim 9, wherein the feedback signal is representative of the low voltage output and of a signal provided by the second regulated output.

15. The power converter of claim 9, wherein the inductance of the first inductor is less than half of the inductance of the second inductor.

\* \* \* \* \*